(12) United States Patent

Lomen

(10) Patent No.: US 12,601,824 B2

(45) Date of Patent: Apr. 14, 2026

(54) ESTIMATION OF RELATIVE VELOCITY BETWEEN TRANSMITTER AND RECEIVER

(71) Applicant: BAE SYSTEMS Information and Electronic Systems Integration Inc., Nashua, NH (US)

(72) Inventor: Brandt J. Lomen, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 495 days.

(21) Appl. No.: 18/297,264

(22) Filed: Apr. 7, 2023

(65) Prior Publication Data

US 2024/0337740 A1     Oct. 10, 2024

(51) Int. Cl.
    *G01S 11/04*     (2006.01)
    *G01S 7/02*     (2006.01)

(52) U.S. Cl.
    CPC .............. *G01S 11/04* (2013.01); *G01S 7/021* (2013.01)

(58) Field of Classification Search
    CPC .......... G01S 11/02; G01S 11/04; G01S 11/10; G01S 3/14; G01S 7/021
    See application file for complete search history.

(56) References Cited

U.S. PATENT DOCUMENTS

| | | | | | |
|---|---|---|---|---|---|
| 5,563,806 | A | * | 10/1996 | Barry | ...................... G01S 7/021 |
| | | | | | 702/190 |
| 2014/0025284 | A1 | * | 1/2014 | Roberts | ..................... G01S 5/16 |
| | | | | | 701/300 |
| 2023/0152447 | A1 | * | 5/2023 | Suzuki | ...................... G01S 7/40 |
| | | | | | 342/146 |

OTHER PUBLICATIONS

Botha, E. and Faul, K., "An Introduction to Radio Direction Finding." Alaris Antennas, retrieved from the internet at: https://www.alarisantennas.com/blog/an-introduction-to-radio-direction-finding/, Nov. 4, 2020. 6 pages.
"What Is Synthetic Aperture Radar?" Earthdata—NASA, retrieved from the internet at: https://www.earthdata.nasa.gov/learn/backgrounders/what-is-sar. Apr. 10, 2020. 11 pages.

\* cited by examiner

*Primary Examiner* — Timothy A Brainard
(74) *Attorney, Agent, or Firm* — Gary McFaline

(57) ABSTRACT

Techniques are provided for estimation of relative velocity between a receiver platform and a transmitter platform. A methodology implementing the techniques according to an embodiment includes measuring a first time of arrival, a first phase, and a frequency of a first radar pulse received from the transmitter platform. The method also includes measuring a second time of arrival and a second phase of a second radar pulse received from the transmitter platform. The method further includes calculating a relative velocity between the receiver platform and the transmitter platform based on a difference between the first time of arrival and the second time of arrival, a difference between the first phase and the second phase, and the frequency. The method further includes calculating an angle of arrival of the first and second received radar pulses based on a ratio of the calculated relative velocity to a velocity of the receiver platform.

17 Claims, 6 Drawing Sheets

EW Environment
100

Receiver Platform
with EW System
110

Transmitted Pulses
120

EW System
140

Transmitter Platform
130

EW Environment
100

Receiver Platform
with EW System
110

Transmitted Pulses
120

EW System
140

Transmitter Platform
130

Transmitted Pulses
120

Sinusoidal Waveform
210

CW Pulse 0
220a

CW Pulse 1
220b

CW Pulse 2
220c

Receiver Time
230

Pulse TOA
240

EW Situational Awareness
300

Receiver Platform
with EW System
110

Velocity *v*
310

AOA
330

Relative Velocity *r dot*
320

Transmitter Platform
130

EW System
140

Antenna
410

RF Signal
415

RF Front End
420

Analog Signal
425

ADC
430

Digital Signal
435

Pulse
Measurement
Circuit
440

Pulse N Data
450

Rel v
Calculation
Circuit
480 r dot
320

Delay
Memory
460

Pulse N-1
Data
470

AOA
Calculation
Circuit
490

AOA
330

500

Processing Platform
600

ESTIMATION OF RELATIVE VELOCITY BETWEEN TRANSMITTER AND RECEIVER

STATEMENT OF GOVERNMENT INTEREST

This invention was made with United States Government assistance. The United States Government has certain rights in this invention.

FIELD OF DISCLOSURE

The present disclosure relates to direction finding capability for electronic warfare (EW) systems, including cognitive EW systems, and more particularly to estimation of relative velocity between a transmitter and receiver for use in direction finding.

BACKGROUND

Direction finding systems sometimes employ a mechanically operated directional antenna that can be physically steered to search for a transmitter. In situations where mechanical methods are not feasible, systems may employ Doppler-based direction finding techniques, antenna arrays, and/or synthetic aperture radars (SARs). For many applications, however, these approaches may also not be possible or practical. For example, size and weight constraints may preclude use of multiple antennas, and SARs typically require knowledge of the characteristics of the transmitted signal which is not always available.

Although the following Detailed Description will proceed with reference being made to illustrative embodiments, many alternatives, modifications, and variations thereof will be apparent in light of this disclosure.

DETAILED DESCRIPTION

Techniques are provided herein for estimation of relative velocity between a transmitter platform and a receiver platform using a single antenna, and for providing EW direction finding capability based on the estimated relative velocity. As noted above, existing direction finding techniques that require mechanical antenna steering, multiple antennas (e.g., an antenna array), and/or knowledge of transmitted signal characteristics may not be suitable for many applications.

To this end, and in accordance with an embodiment of the present disclosure, an EW system is disclosed which provides improved situational awareness for a receiver platform by estimating relative velocity and AOA for pulsed continuous wave (CW) radar signals originating from a transmitter platform. The provided relative velocity and AOA can then be used for many purposes such as, for example, threat warning, evasion, and targeting. The disclosed system can be used, for instance, in a wide variety of applications including, for example, aircraft, missiles, and projectiles, although other applications will be apparent.

In accordance with an embodiment, the EW system includes a pulse measurement circuit configured to measure a time of arrival (TOA), a phase, and a frequency of a first received radar pulse. The pulse measurement circuit is also configured to measure a second TOA and a second phase of a second received radar pulse. The EW system also includes a relative velocity calculation circuit configured to calculate a relative velocity between the receiver platform (e.g., the platform that hosts the EW system) and a transmitter platform from which the first and second radar pulses are transmitted. The calculation of relative velocity is based on (1) a difference between the TOAs of the first and second pulses, (2) a difference between the phases of the first and second pulses, and (3) the CW frequency of the pulse sinusoid. The EW system further includes an AOA calculation circuit configured to calculate an AOA of the received radar pulses based on a ratio of the calculated relative velocity to a velocity of the receiver platform.

It will be appreciated that the techniques described herein may provide improved EW situational awareness capabilities, compared to systems that require mechanical antenna steering, multiple antennas, and/or knowledge of received signal characteristics. Numerous embodiments and applications will be apparent in light of this disclosure.

System Architecture

Figure 1:
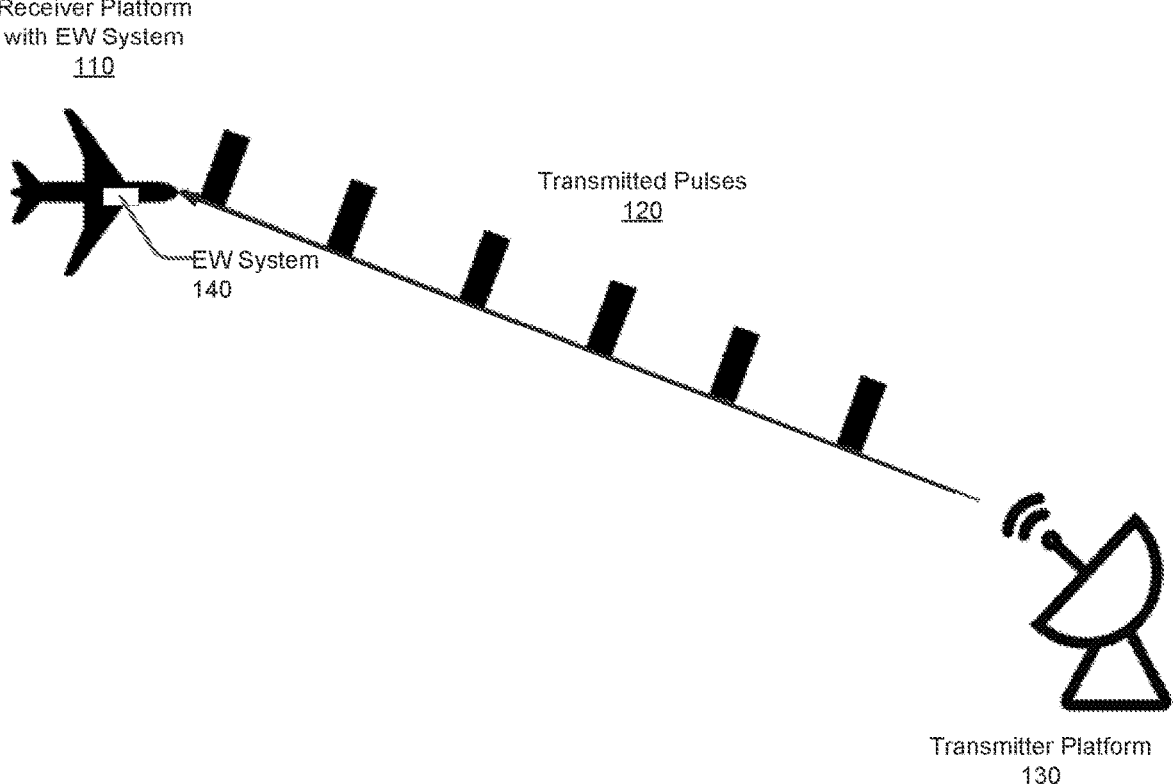
FIG. 1 illustrates an EW environment, in accordance with certain embodiments of the present disclosure.

FIG. 1 illustrates an EW environment 100, in accordance with certain embodiments of the present disclosure. A receiver platform 110, such as for example an aircraft, is shown to include an EW system 140. The EW system 140 is configured to receive and process radar pulses 120 that are transmitted from platform 130, as described below. In some embodiments, the EW system may be a cognitive EW system (CEWS). Additional details regarding CEWS can be found, for example, in U.S. application Ser. No. 16/953,659 filed Nov. 20, 2020, and titled "Radar Electronic Countermeasures Without a Threat Database," which is incorporated herein by reference in its entirety. The term EW system as used herein is understood to include CEW systems.

Figure 2:
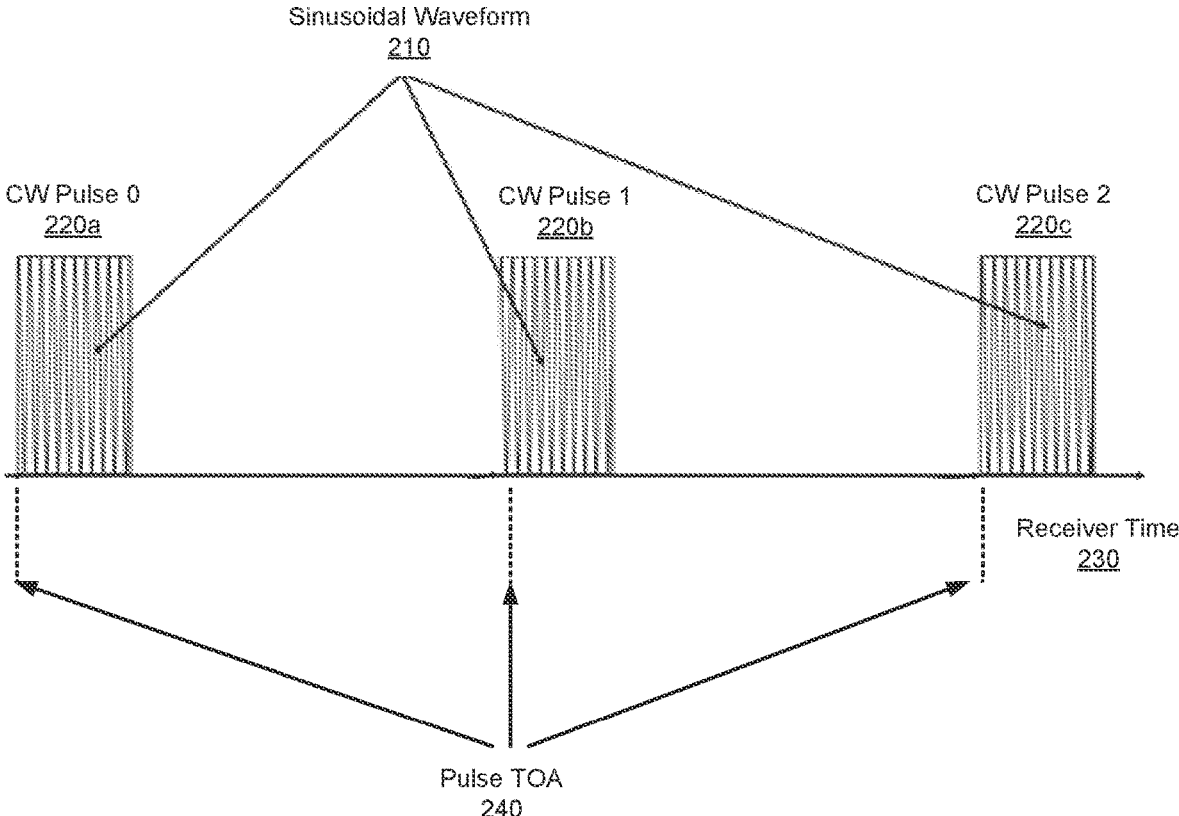
FIG. 2 illustrates transmitted pulses, in accordance with certain embodiments of the present disclosure.

FIG. 2 illustrates transmitted pulses 120, in accordance with certain embodiments of the present disclosure. As shown, a stream of CW radar pulses $220a$, $220b$, $220c$, . . . is transmitted by the transmitter platform 130 and received by the EW system. Each pulse is associated with a TOA 240 as measured by the receiver (e.g., using a clock that keeps receiver time 230). As also shown, each CW radar pulse 220 comprises a complex sinusoidal waveform 210.

Figure 3:
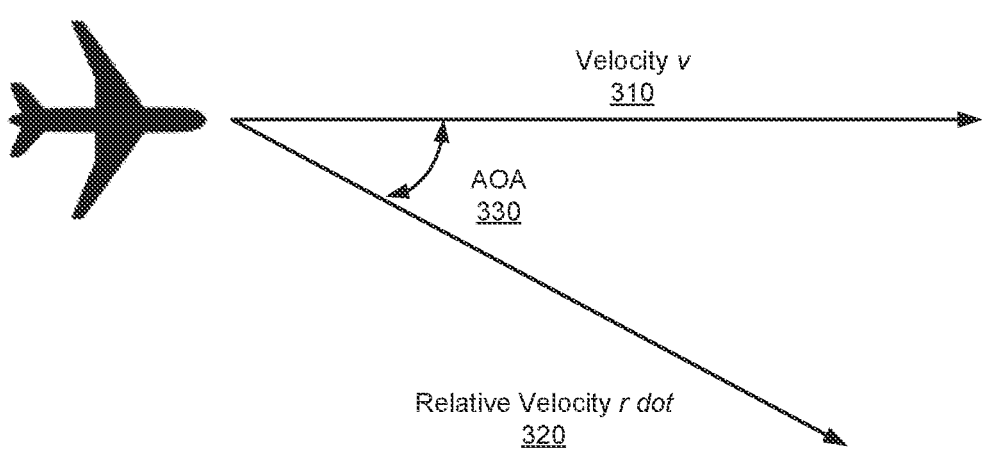
FIG. 3 illustrates EW situational awareness 300, including relative velocity and angle of arrival (AOA), in accordance with certain embodiments of the present disclosure.
Figure 3:

FIG. 3 illustrates EW situational awareness 300, including relative velocity 320 and AOA 330, in accordance with certain embodiments of the present disclosure. As shown in this example, the receiver platform 110 is moving with a velocity vector v 310, which can be in any direction (e.g., not necessarily towards the transmitter platform 130). The relative velocity 320 is also shown. The relative velocity is the component of the receiver platform velocity vector v 310 that is directed towards the transmitter platform 130. The relative velocity is also referred to as ṙ because it represents the rate of change of range between the receiver platform 110 and the transmitter platform 130. The AOA 330 is also shown as the angle between the velocity vector v 310 and the relative velocity vector ṙ 320.

Figure 4:
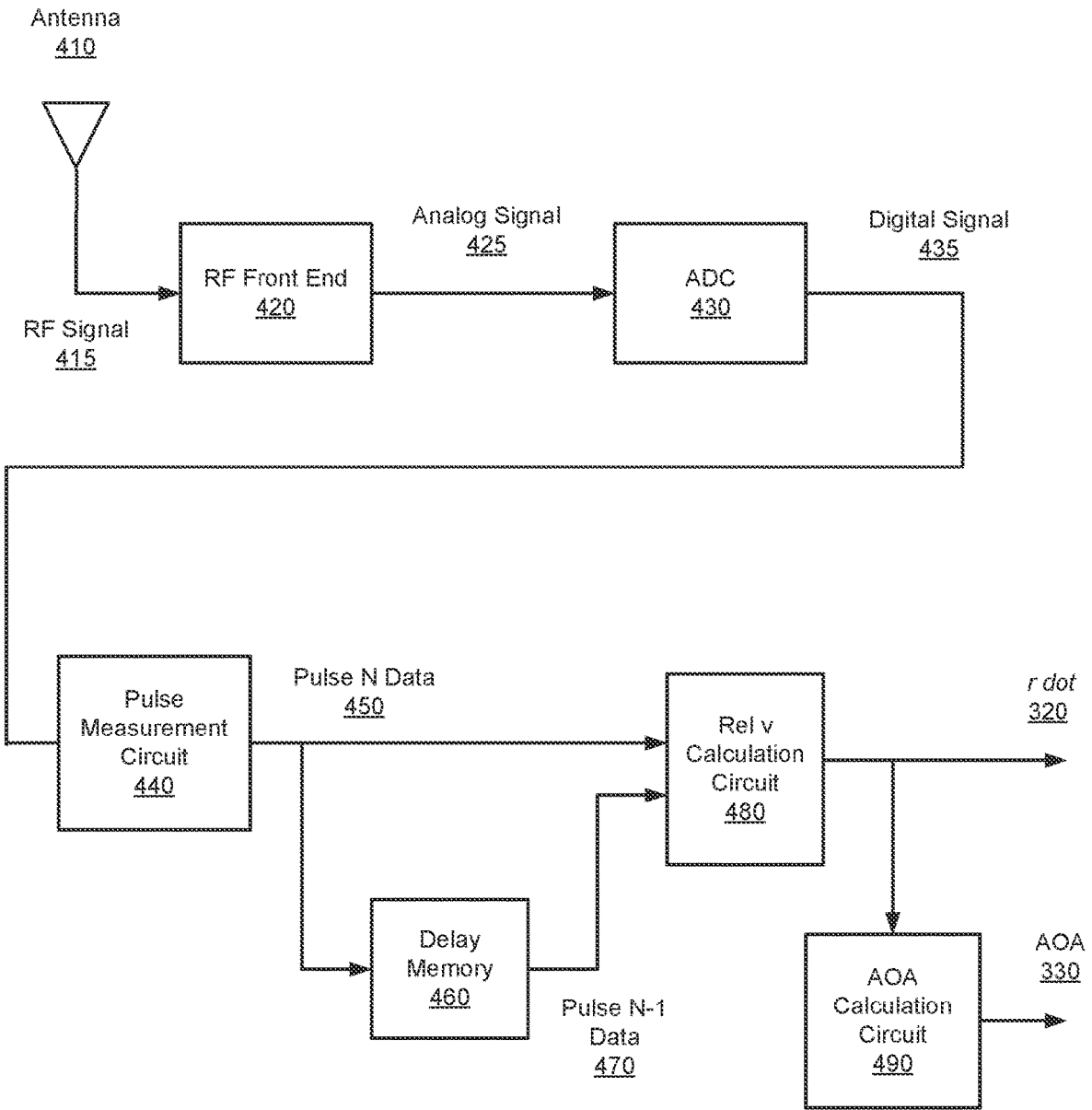
FIG. 4 is a block diagram of the EW system of FIG. 1, configured in accordance with certain embodiments of the present disclosure.

FIG. 4 is a block diagram of the EW system 140 of FIG. 1, configured in accordance with certain embodiments of the present disclosure. The EW system 140 is shown to include an antenna 410, an RF front end 420, and analog to digital converter (ADC) 430, a pulse measurement circuit 440, a delay memory 460, a relative velocity calculation circuit 480, and an AOA calculation circuit 490.

The antenna 410 is configured to receive an RF signal 415 that includes the transmitted pulses 120. The RF front end 420 is configured to down convert the RF signal 415 into an analog signal 425. The RF front end may employ any suitable techniques including, for example, filtering, amplifying, frequency mixing, etc. The ADC 430 is configured to transform the analog signal 425 provided by the RF front end 420 into a digital signal 435 for subsequent processing in the digital domain.

The pulse measurement circuit 440 is configured to measure characteristics of the CW radar pulses 220 of the received digital signal 435. In particular, the characteristics to be measured include TOA, phase, and frequency of each radar pulse.

In some embodiments, the TOA is measured by an envelope detector configured to detect the rising edge of the pulse 220 and a clock circuit configured to generate a time stamp associated with that rising edge. The clock circuit need only provide relatively consistent timing from pulse to pulse and does not necessarily require synchronization to other external clocks or time standards.

In some embodiments, the phase of the pulse is measured by sampling values of the complex sinusoidal waveform 210 of the pulse, calculating the phase of each sample, and averaging those sample phases over the duration of the pulse.

The frequency of the pulse may be obtained by any suitable method, including for example, performing a fast Fourier transform (FFT) on the samples of the complex sinusoidal waveform 210.

The delay memory 460 is a memory that is configured to store the measurements obtained from the current received pulse (pulse N data 450) until measurement of the next received pulse can be obtained. In this manner, current and previous pulse data (e.g., pulse N data 450 and pulse N−1 data 470) is presented to the relative velocity calculation circuit 480 after each new pulse is received and processed.

The relative velocity calculation circuit 480 is configured to calculate a relative velocity 320 between the receiver platform and the transmitter of the radar pulses. The calculation of relative is velocity based on (1) the difference between the TOA of a first pulse and the TOA of second pulse, (2) the difference between the phase of the first pulse and the phase of the second pulse, and the frequency of the frequency of the pulses (which is assumed to remain relatively constant from one pulse to the next). In some embodiments, the relative velocity is calculated as $$\dot{r} = (\phi_2 - \phi_1) * c / ((TOA_2 - TOA_1) * 2pi * f)$$

where $\phi_1$ is the first phase, $\phi_2$ is the second phase, c is the speed of light, $TOA_1$ is the first time of arrival, $TOA_2$ is the second time of arrival, and $f$ is the frequency.

The AOA calculation circuit 490 is configured to calculate the AOA 330 of the received radar pulses based on a ratio of the calculated relative velocity 480 to the velocity of the receiver platform. In some embodiments, the AOA is calculated as $$AOA = \arccos\left(\frac{\dot{r}}{v}\right)$$

here v is the known velocity of the receiver platform. The known velocity of the receiver platform may be obtained through GPS, navigation systems, or by any other suitable means.

The EW system 140 is configured to process subsequent received pulses in the train of pulses 120 to provide updates of the relative velocity 320 and AOA 330. For example, pulses N and N+1 may be used to calculate a first relative velocity and/or AOA and then pulses N+1 and N+2 may be used to calculate a second (e.g., updated) relative velocity and/or AOA. The process may continue for as long as pulses are received. In some embodiments, the sequence of relative velocity values and AOA values may be supplied to a tracking filter (e.g., a Kalman filter or other suitable filter) to improve the accuracy of the estimates of relative velocity and AOA.

Methodology

Figure 5:
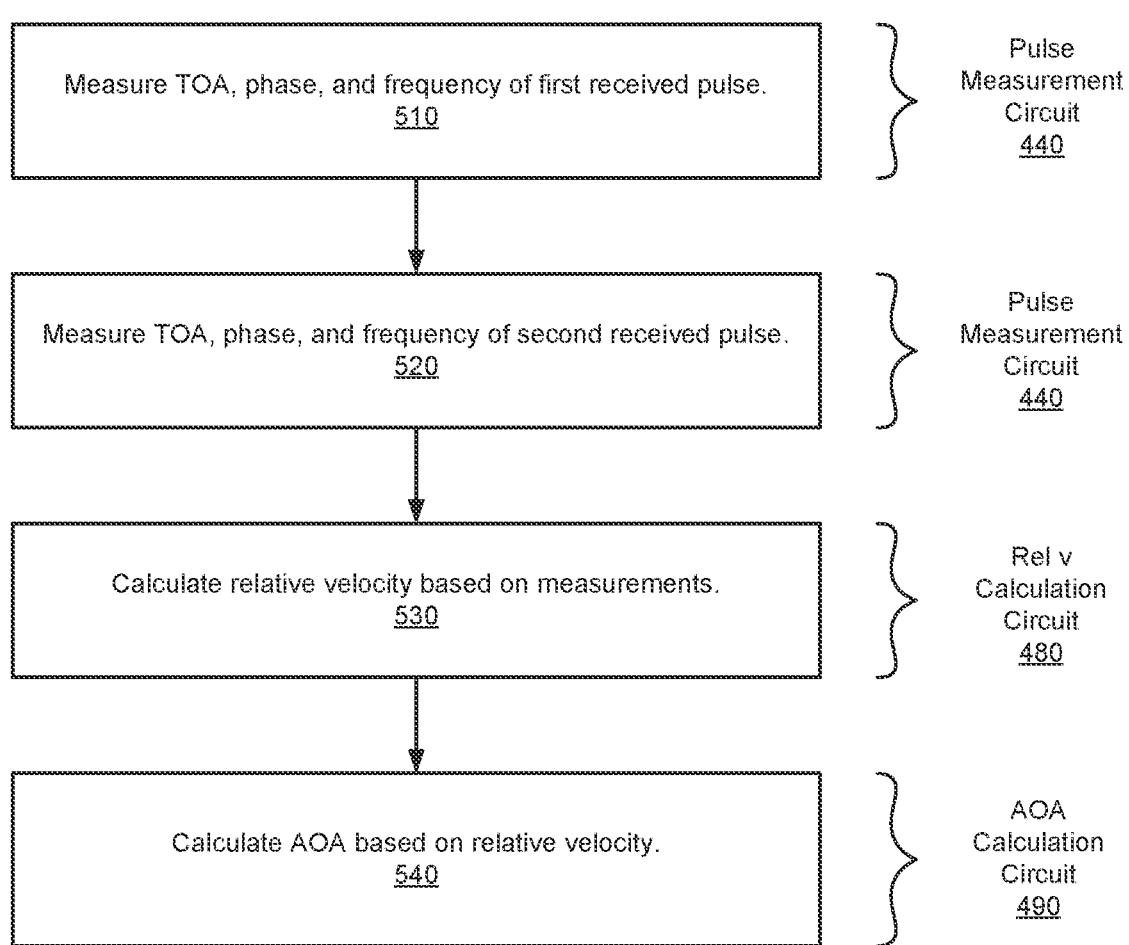
FIG. 5 is a flowchart illustrating a methodology for estimating relative velocity and AOA, in accordance with an embodiment of the present disclosure.

FIG. 5 is a flowchart illustrating a methodology 500 for estimating relative velocity and AOA, in accordance with an embodiment of the present disclosure. As can be seen, example method 500 includes a number of phases and sub-processes, the sequence of which may vary from one embodiment to another. However, when considered in aggregate, these phases and sub-processes form a process for providing relative velocity and AOA, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by measuring TOA, phase, and frequency of a first received radar pulse. At operation 520, the TOA and phase of a second received radar pulse are measured. In some embodiments, the phase is measured by sampling values of a complex sinusoidal waveform in the received radar pulse and averaging the phase of the sampled values.

At operation 530, the relative velocity between the receiver platform and the transmitter platform is calculated based on the difference between the first TOA and the second TOA, the difference between the first phase and the second phase, and the frequency, as previously described. In some embodiments, the relative velocity is calculated as $$r = (\phi_2 - \phi_1) * c / ((TOA_2 - TOA_1) * 2pi * f)$$

where $\phi_1$ is the first phase, $\phi_2$ is the second phase, c is the speed of light, $TOA_1$ is the first time of arrival, $TOA_2$ is the second time of arrival, and $f$ is the frequency.

At operation 540, the AOA of the first and second received radar pulses is calculated based on a ratio of the calculated relative velocity between the platforms to the velocity of the receiver platform, as described previously. In some embodiments, the AOA is calculated as $$AOA = \arccos\left(\frac{\dot{r}}{v}\right)$$

where v is the velocity of the receiver platform, which may be obtained through GPS, navigation systems, or by any other suitable means.

Of course, in some embodiments, additional operations may be performed, as previously described in connection with the system. For example, the process may be repeated on additional (e.g., subsequently) received radar pulses, to update the relative velocity and/or AOA over time. In some embodiments, a tracking filter (e.g., a Kalman filter) may be used to perform the tracking and provide improved estimates.

Example System

Figure 6:
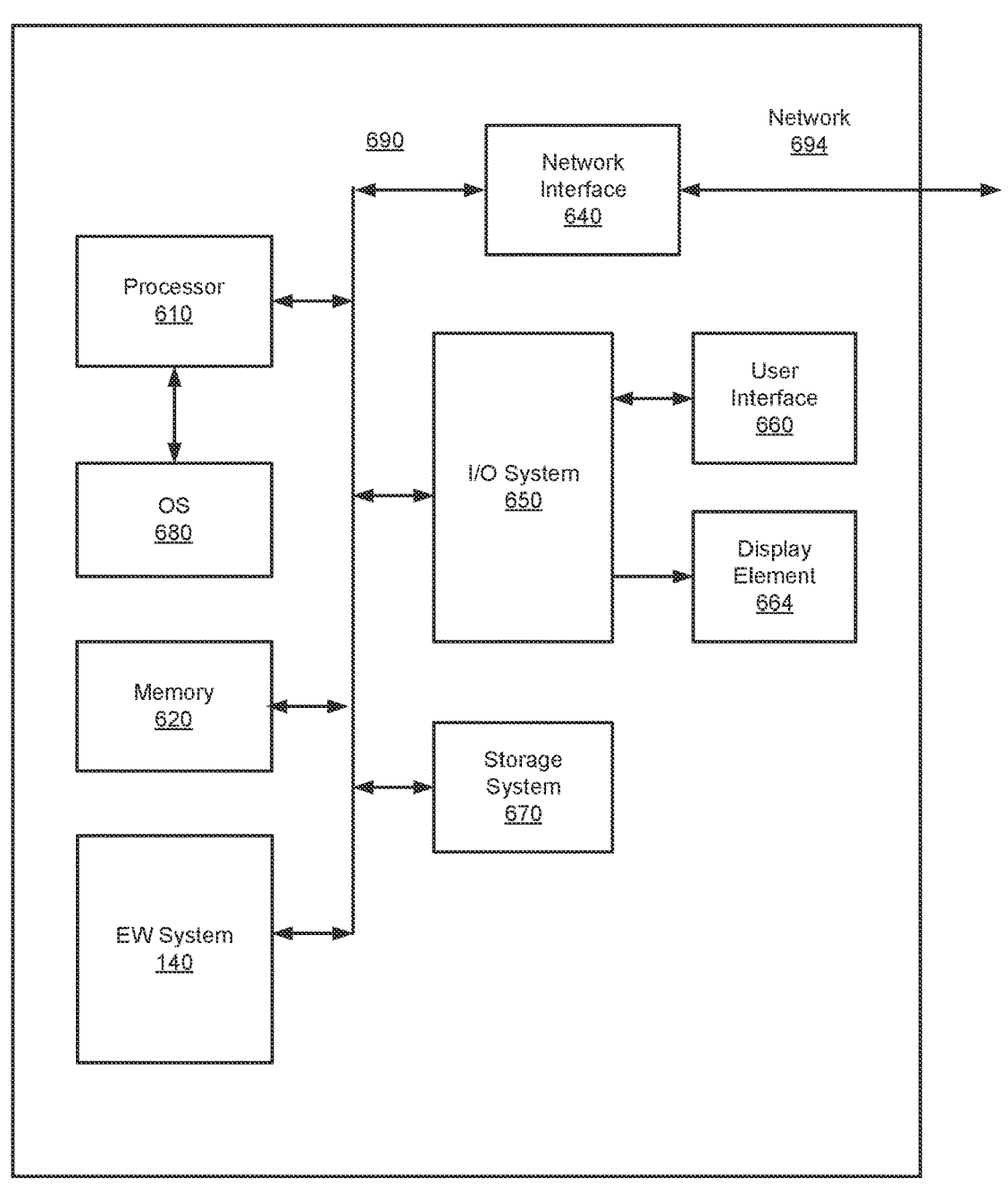
FIG. 6 is a block diagram of a processing platform configured to provide the EW capabilities of FIG. 4, in accordance with an embodiment of the present disclosure.

FIG. 6 is a block diagram of a processing platform 600 configured to provide the EW capabilities of FIG. 4, in accordance with an embodiment of the present disclosure. In some embodiments, platform 600, or portions thereof, may be hosted on, or otherwise be incorporated into the electronic systems of an aircraft or space-based platform, including data communications systems, radar systems, computing systems, or embedded systems of any sort. The disclosed techniques may also be used to provide improved situational awareness, including relative velocity to a transmitter platform and AOA estimation in an EW environment.

In some embodiments, platform 600 may comprise any combination of a processor 610, memory 620, a network interface 640, an input/output (I/O) system 650, a user interface 660, a display element 664, and a storage system 670. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multi-threaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

EW system 140 is configured to provide improved situational awareness, including an estimate of relative velocity to the transmitter platform and an AOA estimation of the pulses received from the transmitter platform, as described previously. EW system 140 may include any or all of the circuits/components illustrated in FIG. 4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a relative velocity estimation system comprising: a pulse measurement circuit configured to measure a first time of arrival, a first phase, and a frequency of a first received radar pulse, and to measure a second time of arrival and a second phase of a second received radar pulse; and a relative velocity calculation circuit configured to calculate a relative velocity between a receiver platform configured to host the relative velocity estimation system and a transmitter of the first and second received radar pulses, the calculation of relative velocity based on a difference between the first time of arrival and the second time of arrival, a difference between the first phase and the second phase, and the frequency.

Example 2 includes the system of Example 1, further comprising an angle of arrival (AOA) calculation circuit configured to calculate an AOA of the first and second received radar pulses based on a ratio of the calculated relative velocity to a velocity of the receiver platform.

Example 3 includes the system of Example 2, wherein the AOA is calculated as the arccosine of the ratio of the calculated relative velocity to the velocity of the receiver platform.

Example 4 includes the system of any of Examples 1-3, wherein the relative velocity is calculated as $(ph2-ph1)*c$ divided by $(TOA2-TOA1)*2pi*f$, where $ph1$ is the first phase, $ph2$ is the second phase, $c$ is the speed of light, $TOA1$ is the first time of arrival, $TOA2$ is the second time of arrival, and $f$ is the frequency.

Example 5 includes the system of any of Examples 1-4, wherein the first phase is measured by sampling values of a complex sinusoidal waveform of the first received radar pulse and averaging the phase of the sampled values.

Example 6 includes the system of any of Examples 1-5, further comprising a delay memory configured to store the first time of arrival, the first phase, and the frequency until the second received radar pulse is processed.

Example 7 includes the system of any of Examples 1-6, further comprising an antenna, a radio frequency (RF) front end circuit coupled to the antenna, and an analog to digital converter (ADC) coupled to the RF front end circuit configured to receive the first radar pulse and the second radar pulse.

Example 8 is an electronic warfare (EW) system comprising the relative velocity estimation system of claim 1.

Example 9 is a method for estimating relative velocity between a receiver platform and a transmitter platform, the method comprising: measuring, by a processor-based system, a first time of arrival, a first phase, and a frequency of a first received radar pulse transmitted by the transmitter platform; measuring, by the processor-based system, a second time of arrival and a second phase of a second received radar pulse transmitted by the transmitter platform; and calculating, by the processor-based system, a relative velocity between the receiver platform and the transmitter platform based on a difference between the first time of arrival and the second time of arrival, a difference between the first phase and the second phase, and the frequency.

Example 10 includes the method of Example 9, further comprising calculating an angle of arrival (AOA) of the first and second received radar pulses based on a ratio of the calculated relative velocity to a velocity of the receiver platform.

Example 11 includes the method of Example 10, wherein the AOA is calculated as the arccosine of the ratio of the calculated relative velocity to the velocity of the receiver platform.

Example 12 includes the method of any of Examples 9-11, wherein the relative velocity is calculated as (ph2–ph1)*c divided by (TOA2–TOA1)*2pi*$f$, where ph1 is the first phase, ph2 is the second phase, c is the speed of light, TOA1 is the first time of arrival, TOA2 is the second time of arrival, and $f$ is the frequency.

Example 13 includes the method of any of Examples 9-12, wherein the first phase is measured by sampling values of a complex sinusoidal waveform of the first received radar pulse and averaging the phase of the sampled values.

Example 14 includes the method of any of Examples 9-13, further comprising repeating the process for a plurality of subsequent received radar pulses to obtain updated estimates of relative velocity between the receiver platform and the transmitter platform over time.

Example 15 is a computer program product including one or more non-transitory machine-readable mediums encoded with instructions that when executed by one or more processors cause a process to be carried out for estimating relative velocity between a receiver platform and a transmitter platform, the process comprising: measuring a first time of arrival, a first phase, and a frequency of a first received radar pulse transmitted by the transmitter platform; measuring a second time of arrival and a second phase of a second received radar pulse transmitted by the transmitter platform; and calculating a relative velocity between the receiver platform and the transmitter platform based on a difference between the first time of arrival and the second time of arrival, a difference between the first phase and the second phase, and the frequency.

Example 16 includes the computer program product of Example 15, wherein the process further comprises calculating an angle of arrival (AOA) of the first and second received radar pulses based on a ratio of the calculated relative velocity to a velocity of the receiver platform.

Example 17 includes the computer program product of Example 16, wherein the AOA is calculated as the arccosine of the ratio of the calculated relative velocity to the velocity of the receiver platform.

Example 18 includes the computer program product of any of Examples 15-17, wherein the relative velocity is calculated as (ph2–ph1)*c divided by (TOA2–TOA1) *2pi*$f$, where ph1 is the first phase, ph2 is the second phase, c is the speed of light, TOA1 is the first time of arrival, TOA2 is the second time of arrival, and $f$ is the frequency.

Example 19 includes the computer program product of any of Examples 15-18, wherein the first phase is measured by sampling values of a complex sinusoidal waveform of the first received radar pulse and averaging the phase of the sampled values.

Example 20 includes the computer program product of any of Examples 15-19, further comprising repeating the process for a plurality of subsequent received radar pulses to obtain updated estimates of relative velocity between the receiver platform and the transmitter platform over time.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A relative velocity estimation system comprising:
a pulse measurement circuit configured to measure a first time of arrival, a first phase, and a frequency of a first received radar pulse, and to measure a second time of arrival and a second phase of a second received radar pulse;
a relative velocity calculation circuit configured to calculate a relative velocity between a receiver platform configured to host the relative velocity estimation system and a transmitter of the first and second received radar pulses, the calculation of relative velocity based on a difference between the first time of arrival and the second time of arrival, a difference between the first phase and the second phase, and the frequency; and
an angle of arrival (AOA) calculation circuit configured to calculate an AOA of the first and second received radar pulses based on a ratio of the calculated relative velocity to a velocity of the receiver platform.

2. The system of claim 1, wherein the AOA is calculated as the arccosine of the ratio of the calculated relative velocity to the velocity of the receiver platform.

3. The system of claim 1, wherein the relative velocity is calculated as (ph2–ph1)*c divided by (TOA2–TOA1) *2pi*f, where ph1 is the first phase, ph2 is the second phase, c is the speed of light, TOA1 is the first time of arrival, TOA2 is the second time of arrival, and $f$ is the frequency.

4. The system of claim 1, wherein the first phase is measured by sampling values of a complex sinusoidal waveform of the first received radar pulse and averaging the phase of the sampled values.

5. The system of claim 1, further comprising a memory configured to store the first time of arrival, the first phase, and the frequency until the second received radar pulse is processed.

6. The system of claim 1, further comprising an antenna, a radio frequency (RF) front end circuit coupled to the antenna, and an analog to digital converter (ADC) coupled to the RF front end circuit, the RF front end circuit configured to receive the first radar pulse and the second radar pulse.

7. An electronic warfare (EW) system comprising the relative velocity estimation system of claim 1.

8. A method for estimating relative velocity between a receiver platform and a transmitter platform, the method comprising:

measuring, by an electronic warfare (EW) system, a first time of arrival, a first phase, and a frequency of a first received radar pulse transmitted by the transmitter platform;

measuring, by the EW system, a second time of arrival and a second phase of a second received radar pulse transmitted by the transmitter platform;

calculating, by the EW system, a relative velocity between the receiver platform and the transmitter platform based on a difference between the first time of arrival and the second time of arrival, a difference between the first phase and the second phase, and the frequency, wherein the EW system comprises an antenna, a radio frequency front end, an analog to digital converter, a pulse measurement circuit, and a relative velocity calculation circuit; and calculating an angle of arrival (AOA) of the first and second received radar pulses based on a ratio of the calculated relative velocity to a velocity of the receiver platform.

9. The method of claim 8, wherein the AOA is calculated as the arccosine of the ratio of the calculated relative velocity to the velocity of the receiver platform.

10. The method of claim 8, wherein the relative velocity is calculated as (ph2−ph1)*c divided by (TOA2−TOA1) *2pi*f, where ph1 is the first phase, ph2 is the second phase, c is the speed of light, TOA1 is the first time of arrival, TOA2 is the second time of arrival, and $f$ is the frequency.

11. The method of claim 8, wherein the first phase is measured by sampling values of a complex sinusoidal waveform of the first received radar pulse and averaging the phase of the sampled values.

12. The method of claim 8, further comprising repeating the process for a plurality of subsequent received radar pulses to obtain updated estimates of relative velocity between the receiver platform and the transmitter platform over time.

13. A computer program product including one or more non-transitory machine-readable mediums encoded with instructions that when executed by one or more processors cause a process to be carried out for estimating relative velocity between a receiver platform and a transmitter platform, the process comprising:

measuring a first time of arrival, a first phase, and a frequency of a first received radar pulse transmitted by the transmitter platform;

measuring a second time of arrival and a second phase of a second received radar pulse transmitted by the transmitter platform; and calculating a relative velocity between the receiver platform and the transmitter platform based on a difference between the first time of arrival and the second time of arrival, a difference between the first phase and the second phase, and the frequency; and calculating an angle of arrival (AOA) of the first and second received radar pulses based on a ratio of the calculated relative velocity to a velocity of the receiver platform.

14. The computer program product of claim 13, wherein the AOA is calculated as the arccosine of the ratio of the calculated relative velocity to the velocity of the receiver platform.

15. The computer program product of claim 13, wherein the relative velocity is calculated as (ph2−ph1)*c divided by (TOA2−TOA1)*2pi*f, where ph1 is the first phase, ph2 is the second phase, c is the speed of light, TOA1 is the first time of arrival, TOA2 is the second time of arrival, and $f$ is the frequency.

16. The computer program product of claim 13, wherein the first phase is measured by sampling values of a complex sinusoidal waveform of the first received radar pulse and averaging the phase of the sampled values.

17. The computer program product of claim 13, further comprising repeating the process for a plurality of subsequent received radar pulses to obtain updated estimates of relative velocity between the receiver platform and the transmitter platform over time.

* * * * *